2,998,442
Patented Aug. 29, 1961

2,998,442
FUNGICIDAL COPPER (I) COMPLEX COMPOUND AND PROCESS OF PRODUCING SAME
André Allais, Pierre Girault, and Anatole Vesterman, Paris, France, assignors to UCLAF, Paris, France, a French body corporate
No Drawing. Filed Sept. 12, 1958, Ser. No. 760,574
Claims priority, application France Sept. 18, 1957
3 Claims. (Cl. 260—438)

The present invention relates to a new copper(I) complex compound of dimethyl dithiocarbamic acid, to a process of producing the same, and to its use as fungicide.

It is one object of the present invention to provide the new copper(I) complex compound of dimethyl dithiocarbamic acid which is useful as a fungicide in agriculture.

Another object of the present invention is to provide a simple and effective process of producing said copper(I) complex compound.

Still another object of the present invention is to provide a simple and effective method of treating mildew and other fungal infections of plants.

Other objects of the present invention and advantageous features thereof will become apparent as the description proceeds.

The new copper(I) complex compound of dimethyl dithiocarbamic acid according to the present invention corresponds approximately to the formula $$C_3H_6NS_2Cu.2CuCl$$

and is particularly characterized by its high copper content of between about 47% and about 50% and by its high fungicidal activity. It is used in agriculture in the treatment of mildew and other fungal infections of plants. The new compound is characterized by its mode of preparation as described hereinafter and by its high copper content.

In order to prepare the new product according to the present invention which has a higher copper content than copper(I) dimethyl dithiocarbamate, an excess of cuprous chloride in an aqueous solution is reacted with an aqueous solution of sodium dimethyl dithiocarbamate in an inert gas atmosphere and in the presence of sodium bisulfite in order to avoid the conversion of the copper(I) compound into the copper(II) compound. The reaction is carried out in the presence of sodium chloride in order to solubilize the cuprous chloride. The aqueous solution of sodium dimethyl dithiocarbamate may previously be prepared by reaction of carbon disulfide with dimethylamine in the presence of sodium hydroxide. It is, of course, well understood that the metathesis process with cuprous chloride may be carried out, without departing from the scope of the present invention, with another alkali metal salt of dimethyl dithiocarbamic acid than the sodium salt or by using an alkaline earth metal salt of said acid. The reaction is preferably carried out at room temperature. After metathesis is completed, the precipitated complex compound is filtered off with suction, washed first with an aqueous saturated solution of sodium chloride containing 5% of sodium bisulfite and then with water until the wash waters are free of chloride ions. After drying, the compound generally contains between about 47% and about 50% of copper and between about 17% and about 19% of chlorine.

As stated hereinabove, the new copper complex compound according to the present invention is used in agriculture for the treatment of mildew and other fungal plant diseases. Tests have shown that the compound does not possess any phytotoxicity and that it completely protects the leaves of grapevine artificially infected by plasmopara. In these tests first 0.5 cc. of an 0.27% suspension of the compound according to the invention were applied to 75 sq. cm. of leaf surface and the thus treated leaves were subjected to four successive infections and to 12 days of rain, for one hour in full. The rainfall corresponds to a rainfall of 12 mm. No fungus infection was observed in the treated leaves while the controls showed severe infection. In the field aqueous suspensions of the new copper(I) complex compound of the formula $C_3H_6NS_2Cu.2CuCl$ are used which contain between about 0.2% and about 0.3% of said compound. The preferred content of the new copper(I) complex compound in such suspensions is about 0.27%.

The following example serves to illustrate the present invention without, however, limiting the same thereto. More particularly, other salts of dimethyl dithiocarbamic acid than those mentioned may be used for metathesis with cuprous chloride or the reaction may be carried out a few degrees below or above room temperature without departing from the principles of the present invention as set forth herein and in the claims annexed hereto.

EXAMPLE

*Preparation of the copper(I) complex of dimethyl dithiocarbamic acid*

A mixture of 487 cc. of an 11.75% solution of sodium dimethyl dithiocarbamate and 300 cc. of a saturated sodium chloride solution is added, while stirring and passing nitrogen through the reaction vessel, to 1,267 cc. of a saturated sodium chloride solution containing 11.75% of cuprous chloride and 5% of sodium bisulfite within 10 minutes. Stirring is continued for 15 more minutes without discontinuing nitrogen passage therethrough. The resulting orange-yellow precipitate is separated by centrifuging and is washed by suspending it three times, each time in one liter of a saturated sodium chloride solution containing 5% of sodium bisulfite. The compound is then washed with water until chlorine ions disappear from the wash water. Thereby, 350 g. of a moist product are obtained which, after drying, yields 163.4 g. of the desired product. The yield corresponds to a quantitative yield.

*Analysis.*—48.2–48.1% Cu; 18.10% Cl; 4.1% N.

The compound has not yet been described in the literature.

We claim:

1. The cuprous complex of dimethyl dithiocarbamic acid containing between about 47% and about 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alakli metal bisulfite and in an inert gas atmosphere.

2. In a process of producing the copper(I) complex compound of dimethyl dithiocarbamic acid containing between about 48% and about 50% of copper and corresponding approximately to the formula $$C_3H_6NS_2Cu.2CuCl$$

the steps which comprise subjecting an aqueous solution of salt of dimethyl dithiocarbamic acid selected from the group consisting of an alkali metal salt and an alkaline earth metal salt, to the action of an excess of copper(I) chloride in an aqueous solution in the presence of an alkali metal chloride and a small amount of sodium bisulfite and an inert gas atmosphere, separating the resulting precipitate, purifying the same by washing first with a saturated sodium chloride solution and then with water until no more chlorine ions are detected in the wash water, and drying the resulting compound.

3. The process according to claim 2, wherein the salt of dimethyl dithiocarbamate is the sodium salt, while the alkali metal chloride is sodium chloride and the inert gas is nitrogen.

References Cited in the file of this patent

UNITED STATES PATENTS

| | | | |
|---|---|---|---|
| Re. 20,869 | Bousquet | | Oct. 4, 1938 |
| Re. 22,750 | Tisdale | | Apr. 30, 1946 |
| 1,972,961 | Tisdale et al. | | Sept. 11, 1934 |
| 2,444,660 | Mathes | | July 6, 1948 |
| 2,472,424 | Hoover | | June 7, 1949 |
| 2,492,314 | Olin et al. | | Dec. 27, 1949 |
| 2,762,822 | Vagenius | | Sept. 11, 1956 |
| 2,854,467 | Harman | | Sept. 30, 1958 |